(12) United States Patent
Lin

(10) Patent No.: US 9,801,492 B1
(45) Date of Patent: Oct. 31, 2017

(54) LIQUID CONTAINER WITH INTERCHANGEABLE ATTACHMENTS

(71) Applicant: Shin-Shuoh Lin, Laguna Hills, CA (US)

(72) Inventor: Shin-Shuoh Lin, Laguna Hills, CA (US)

( * ) Notice: Subject to any disclaimer, the term of this patent is extended or adjusted under 35 U.S.C. 154(b) by 928 days.

(21) Appl. No.: 13/999,359

(22) Filed: Feb. 18, 2014

(51) Int. Cl.
*A47J 31/06* (2006.01)
*A47J 31/20* (2006.01)
*A47G 19/22* (2006.01)
*A47J 31/00* (2006.01)

(52) U.S. Cl.
CPC .......... *A47J 31/20* (2013.01); *A47G 19/2288* (2013.01); *A47J 31/005* (2013.01); *A47J 31/0636* (2013.01); *A47J 31/06* (2013.01)

(58) Field of Classification Search
CPC ..... A47J 31/0636; A47J 31/0647; A47J 31/06
USPC .................................. 99/322, 323, 317, 319
See application file for complete search history.

(56) References Cited

U.S. PATENT DOCUMENTS

| | | | |
|---|---|---|---|
| 5,680,915 A | 10/1997 | Feltman, III et al. | |
| 5,918,761 A | 7/1999 | Wissinger | |
| 6,170,693 B1 | 1/2001 | Goto | |
| 6,276,262 B1 * | 8/2001 | Chen | A23F 3/18 426/435 |
| 6,662,978 B2 | 12/2003 | Lin et al. | |
| 7,299,955 B2 | 11/2007 | Pelkey et al. | |
| D574,244 S | 8/2008 | Lin | |
| D575,156 S | 8/2008 | Lin | |
| 7,571,830 B2 | 8/2009 | Lin | |
| 7,958,816 B2 * | 6/2011 | Lin | A47J 31/02 99/323 |
| 8,307,755 B2 * | 11/2012 | Shen | A47J 31/005 220/501 |
| 8,459,468 B2 | 6/2013 | Lin | |
| 9,516,974 B2 * | 12/2016 | Herling | A47J 31/18 |
| 2010/0263549 A1 * | 10/2010 | Lee | A47J 31/18 99/319 |
| 2011/0056386 A1 * | 3/2011 | Taketani | A47G 19/14 99/317 |
| 2011/0250332 A1 * | 10/2011 | Geissler | A47J 31/20 426/435 |
| 2013/0206717 A1 * | 8/2013 | Lane | A47J 31/18 215/6 |

(Continued)

*Primary Examiner* — Reginald L Alexander
(74) *Attorney, Agent, or Firm* — Gordon K. Anderson

(57) ABSTRACT

A liquid container (10), with attachments, is taught which consists of a vacuum insulated container body (20) with open top and integral threads. A top closure (42) attaches to the container body with mating threads permitting disassembly. A number of removable attachments (64) are fastened to the top closure. A lid (98) is attached to the top closure forming a liquid tight seal for the container. When an infuser attachment is used, brewing media is placed in the infuser and hot water in the container, the media steeps forming a brew, after the lid and media is removed, the beverage is sipped from the closure lip. If a strainer attachment is selected, brewing media and hot water are added into the container, the media steeps forming a brew and, after the lid removed, the beverage is sipped from the closure lip. When an isolator attachment is chosen it replaces the seal ring on the closure thereby covering all exposed thermoplastic surfaces permitting drinking directly from the container body.

16 Claims, 4 Drawing Sheets

(56) References Cited

U.S. PATENT DOCUMENTS

2013/0213978 A1  8/2013 Libourel et al.
2014/0251152 A1* 9/2014 Tien .................... A47J 31/0636
                                               99/322

* cited by examiner

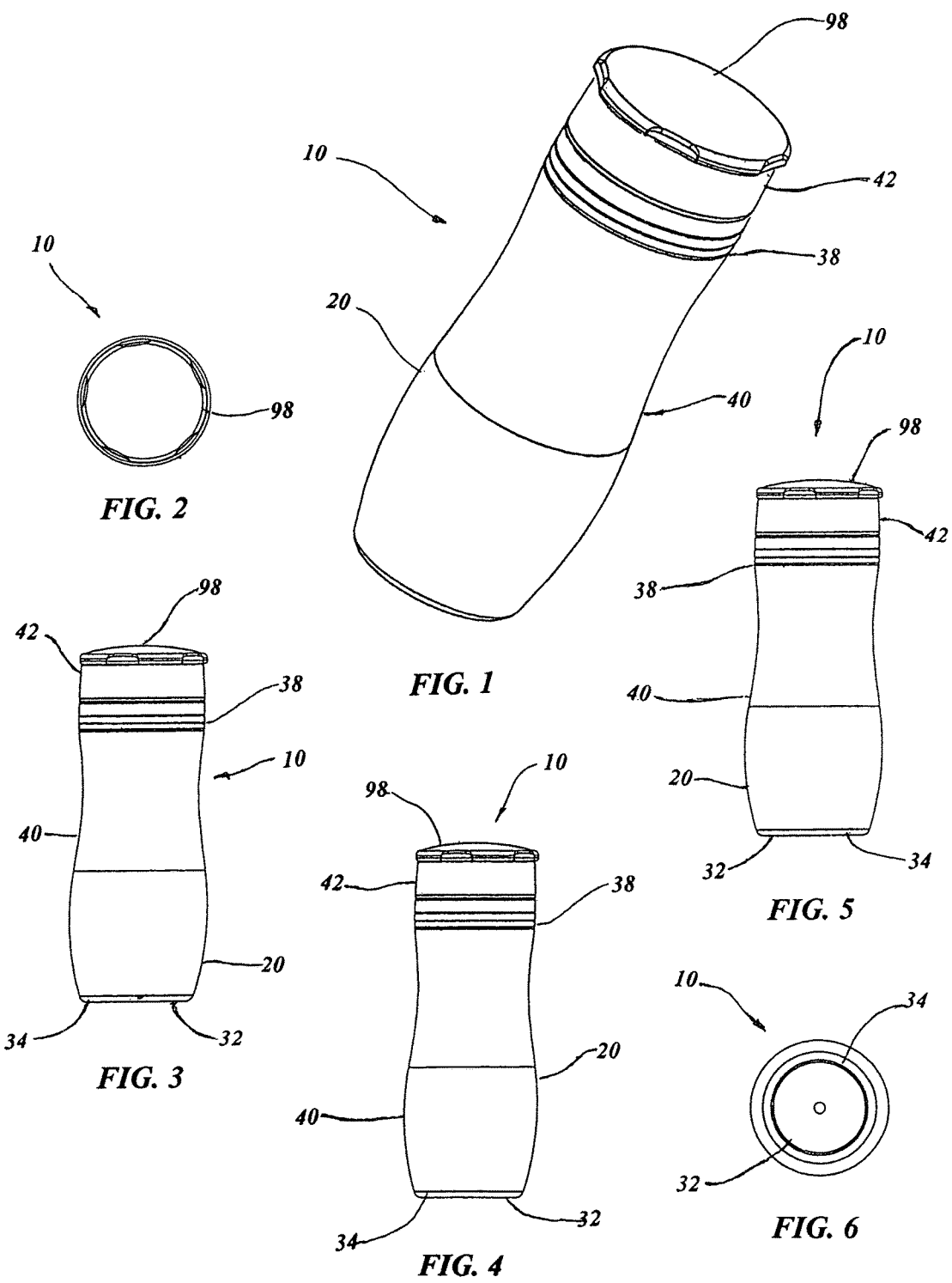

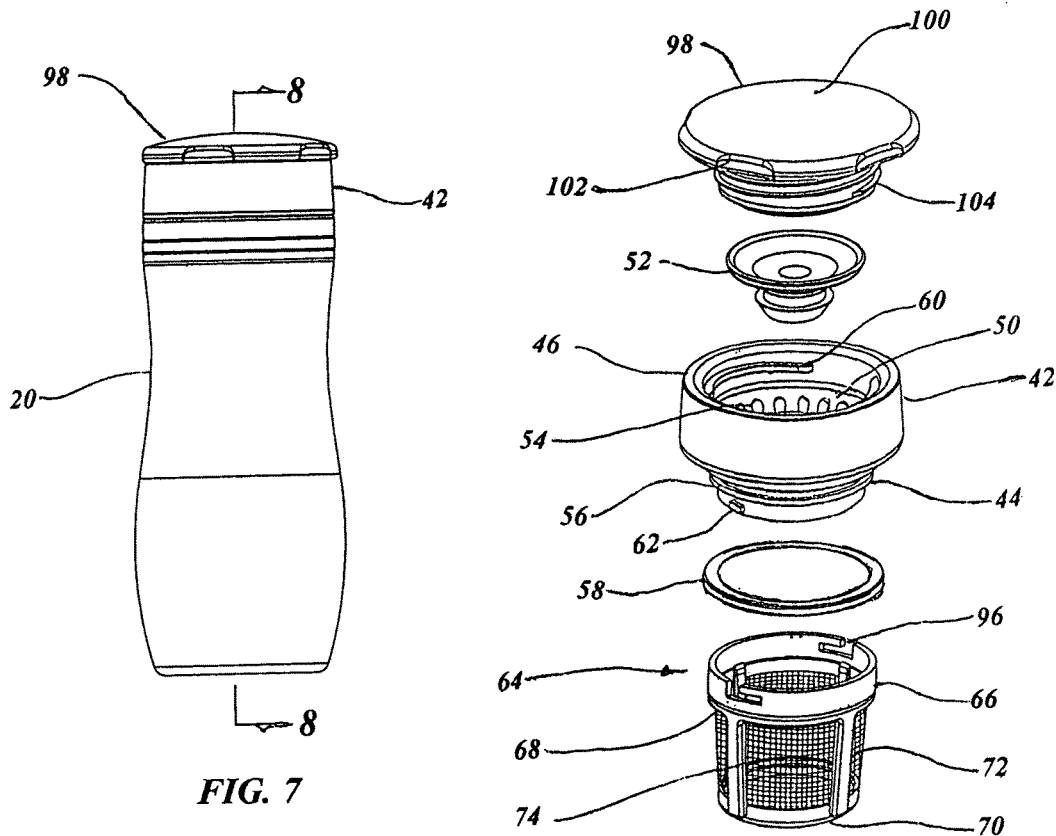
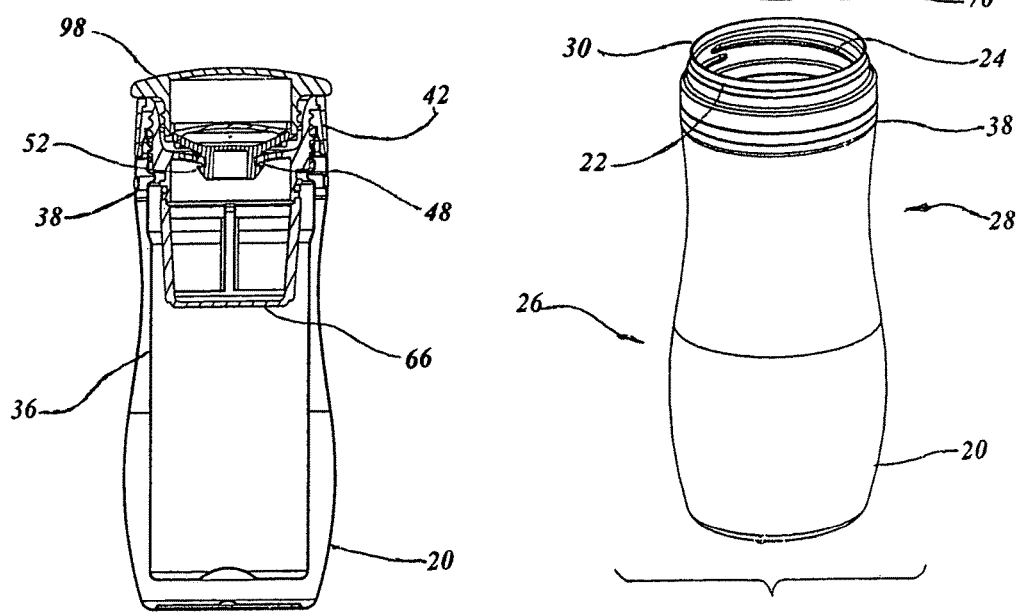
FIG. 7
FIG. 8
FIG. 9

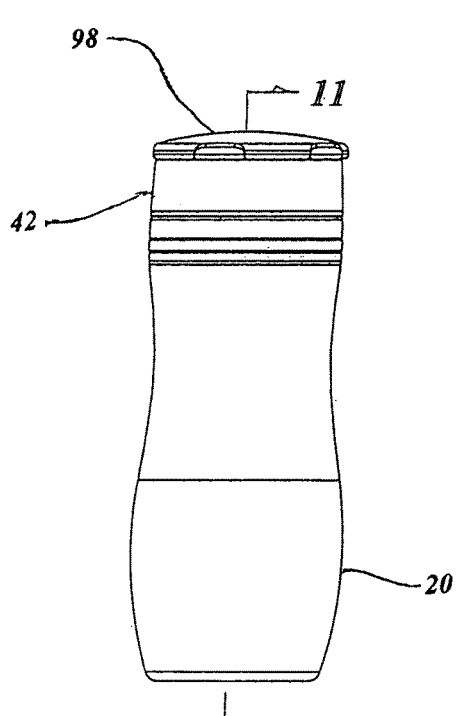
FIG. 10
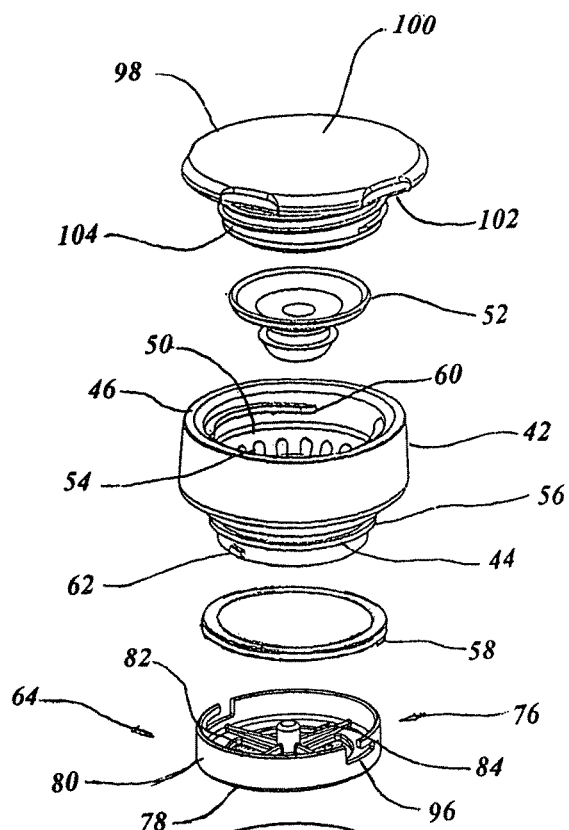
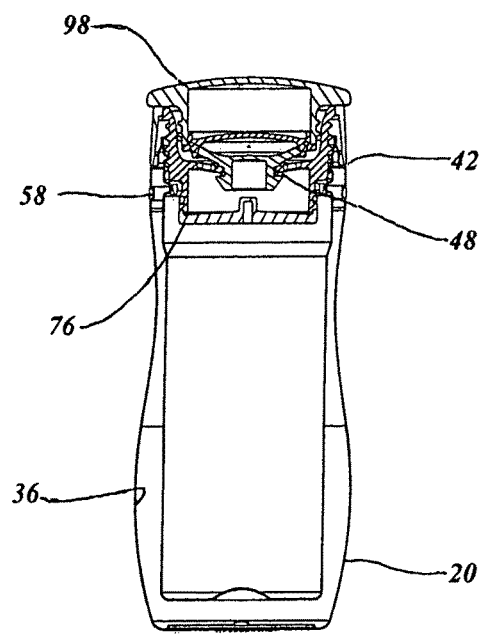
FIG. 11
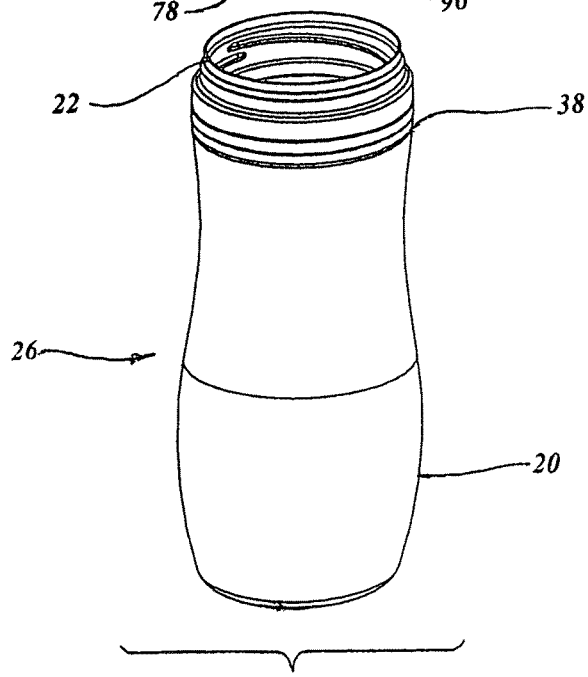
FIG. 12

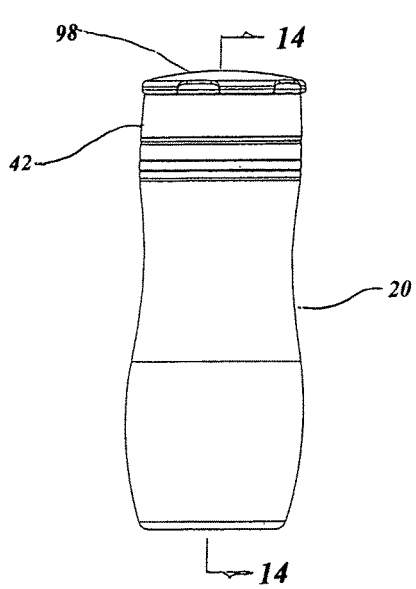
FIG. 13
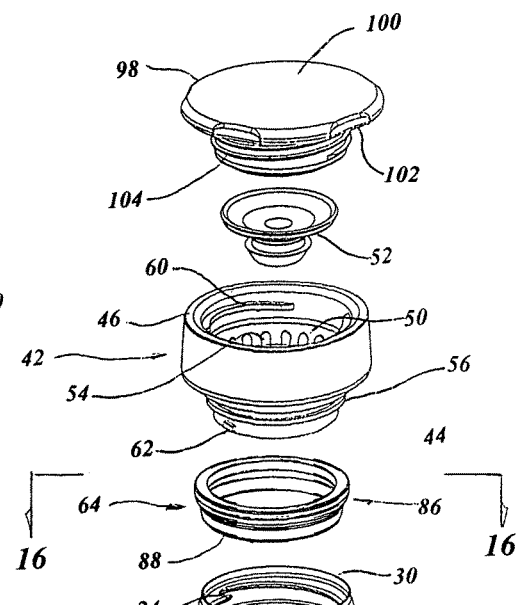
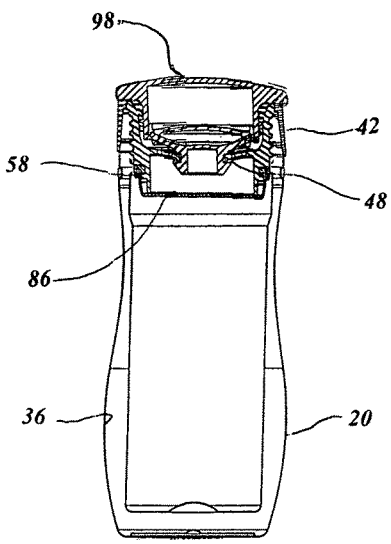
FIG. 14
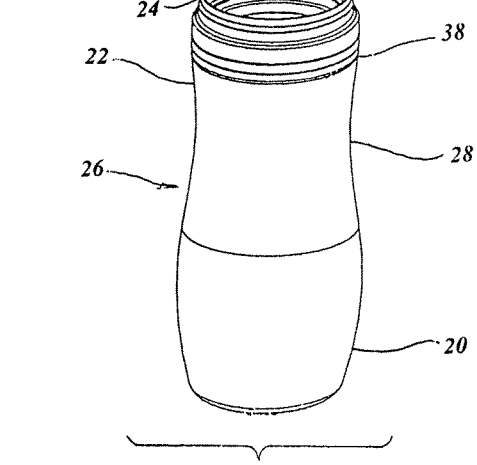
FIG. 15
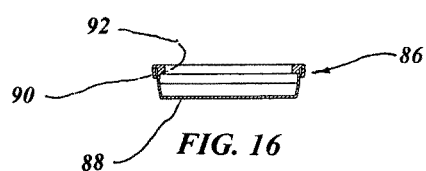
FIG. 16

LIQUID CONTAINER WITH INTERCHANGEABLE ATTACHMENTS

TECHNICAL FIELD

The present invention relates to liquid containers in general. More specifically to a vacuum container with interchangeable elements for brewing beverages and isolating the container interior from all thermoplastic contact.

BACKGROUND ART

Previously, many types of liquid containers have been used in endeavoring to provide an effective means to cover, brew beverages, and drink liquids directly from a container.

The prior art listed below did not disclose patents that possess any of the novelty of the instant invention; however the following U.S. patents are considered related:

| Pat. No. | Inventor | Issue Date |
| --- | --- | --- |
| 5,680,951 | Feltman, III et al. | Oct. 28, 1997 |
| 5,918,761 | Wissinger | Jul. 6, 1999 |
| 6,170,693 B1 | Goto | Jan. 9, 2001 |
| 6,662,978 B2 | Lin et al. | Dec. 16, 2003 |
| 7,299,955 B2 | Pelkey et al. | Nov. 27, 2007 |
| D575,156 S | Lin | Aug. 18, 2008 |
| D574,244 S | Lin | Aug. 5, 2008 |
| 7,571,830 B2 | Lin | Aug. 11, 2009 |
| 7,958,816 B2 | Lin | Jun. 14, 2011 |
| 8,459,468 B2 | Lin | Jun. 11, 2013 |
| 2012/0213978 A1 | Libourel et al. | Aug. 22, 2013 |

Feltman, III et al. in U.S. Pat. No. 5,680,951 teaches a cover for a cup which consists of a cap and a lid which are rotatably mounted and permit fluid flow when openings are aligned. Outwardly extending fingers latch rings together.

U.S. Pat. No. 5,918,761 issued to Wissinger is for an insulated container and cover utilizing a single seal elastomeric ring for sealing mating surfaces and define a cover mounting assembly which is removable.

Goto in U.S. Pat. No. 6,170,693 B1 teaches a drinking receptacle having an inner cover applied to the top of a receptacle main body which also has a heat insulation function. An outer cover and an inner cover are sealed there between forming the insulation barrier. The inner cover has a plate covering the upper opening of the body and includes a drinking spout and an air vent.

Lin et al. in U.S. Pat. No. 6,662,978 B2 disclose a liquid storage vessel stopper having interchangeable plugs each having a body with an inner shell affixed to an outer shell. The inner shell communicates with a liquid storage vessel with threads and the plugs are the so called twist to pour or push to pour type. When the push to pour button is depressed the second time the plug disengages.

U.S. Pat. No. 7,299,955 B2 of Pelkey et al. is for a beverage container lid with a tipper lid with an aperture extending through the body and upper surface. A stopper is provided which is movable for selectable opening and closing.

U.S. Pat. No. 7,571,830 B2 issued to Lin presents a beverage liquid container, with attachments, consisting of an insulated container for holding ingredients for protein supplement drinks. The liquid container with attachments permits mixing by shaking to and fro while retaining large pieces of ice. A removable top member incorporates a smooth peripheral lip for drinking and a lid interfaces with the top member permitting consumption directly from the liquid container with attachments when the lid is removed Lin in U.S. Pat. No. 7,958,816 B2 teaches a multi-function beverage brewer and cap which includes a travel mug. A filter basket is removably positioned within a top opening of the travel mug and a storage container is used to retain additional tea leafs or coffee grounds.

Lin in U.S. Pat. No. 8,459,468 B2 discloses a separable cap for a vacuum mug which consists of a removable lid having a graspable shaped lip and a stopper body which includes a central orifice. The lid is attached to the stopper body and a resilient diaphragm plug is compressed between the lid and the body. A beverage filter is removeably attached to the body permitting a beverage media to be placed therein and hot water poured over the media farming a beverage after steeping.

U.S. patent application publication 2012/0213978 A1 of Libourel et al. teach an insulated container defined with an outer layer and an inner layer with a vacuum space therebetween. A vent equalizes the internal pressure when heated.

For background purposes and as indicative of the art to which the invention is related reference may be made to the remaining cited design patents.

DISCLOSURE OF THE INVENTION

There are many vacuum insulated containers on the market at this time some of which include the capability of brewing a single use beverage and have been popular in this country. The introduction of expanded function in this area is the next step in improvement. Therefore the primary object of the invention is to provide separate removable attachments that allow the user to utilize two methods of brewing tea or makes protection from thermoplastic exposure available for those that prefer a, so called, BPA-free liquid storage container. The invention actually includes four separate attachment embodiments, first all attachments are provided, second a tea brewing infuser only, third a tea media screen only and fourth a thermoplastic isolator only.

Still another feature of the invention employs elements already developed and tooled for production which include; a lid, diaphragm plug, seal ring, and an ornamental band. Only minor changes are required for some of the tooling which include adding studs to only the top closure and bayonet snap-in slots in the infuser cup and strainer.

Yet another feature of the invention is a new and novel shape of the double wall vacuum container body, which is unique as it is configured like a truncated bowling ball with a thick neck.

A further aspect of the invention provides the ability to drink directly from the container after brewing is accomplished. When used the infuser may be removed after to steeping has been completed and the media discarded, when the strainer attachment is selected the tea media may be reused with new hot water and sipped directly from the container lip. If isolation is required the entire top closure may be removed and the liquid is available at the stainless steel top of the container with no thermoplastic ever touching the contents.

Another attribute of the invention is that the attachments are easily connected to the top closure while permitting removal using bayonet type fasteners that lock in by snapping into place.

An important object of the invention permits the top closure to be completely disassembled for cleaning. There are only seven separate parts in the entire invention, some of which may remain attached during normal cleaning such as the ornamental band attached to the container body. When deep cleaning is required all may be removed as the component seal and diaphragm plug are sufficiently resilient invention for assembly or disassembly. No screws or fasteners are found in the entire invention.

A final attribute of the invention is that all of the parts are dishwasher safe as they are made of stainless steel, thermoplastic resin or synthetic elastomers all of which are acceptable for use in an automatic dishwasher.

These and other advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the liquid container with attachments in the preferred embodiment.

FIG. 2 is a top elevation view of the liquid container with attachments in the preferred embodiment.

FIG. 3 is a left side elevation view of the liquid container with attachments in the preferred embodiment.

FIG. 4. is a front elevation view of the liquid container with attachments in the preferred embodiment with the rear view a mirror image thereof.

FIG. 5 is a right side elevation view of the liquid container with attachments in the preferred embodiment.

FIG. 6 is a bottom elevation view of the liquid container with attachments in the preferred embodiment.

FIG. 7 is a rear elevation view of the liquid container having the infuser attachment in the second embodiment.

FIG. 8 is a cross sectional view taken along lines 8-8 of FIG. 7 illustrating the infuser attachment in the second embodiment.

FIG. 9 is an exploded isometric view having the infuser attachment in the second embodiment.

FIG. 10 is a rear elevation view of the liquid container having the strainer attachment in the third embodiment.

FIG. 11 is a cross sectional view taken along lines 11-11 of FIG. 10 illustrating the strainer attachment in the third embodiment.

FIG. 12 is an exploded isometric view having the strainer attachment in the third embodiment.

FIG. 13 is a rear elevation view of the liquid container having the isolator attachment in the fourth embodiment.

FIG. 14 is a cross sectional view taken along lines 14-14 of FIG. 13 illustrating the isolator attachment in the fourth embodiment.

FIG. 15 is an exploded isometric view having the isolator attachment in the fourth embodiment.

FIG. 16 is a cross sectional view taken along lines 16-16 of FIG. 15 illustrating the isolator attachment in the fourth embodiment.

BEST MODE FOR CARRYING OUT THE INVENTION

The best mode for carrying out the invention is presented in terms of a preferred, second, third and fourth embodiment of the liquid container with interchangeable attachments 10 each having a different purpose. The only difference in the four embodiments is in the number of attachments they include, as the preferred embodiment has all three and the others each have a separate attachment.

The preferred embodiment is illustrated in FIGS. 1-16 and consists of a vacuum insulated container having a body 20 with an open top 22 on an apex end and integral female threads 24, configured in a bowling ball shape 26 with a broad neck 28, and a truncated top 30, as depicted best in FIGS. 1, 9, 12 and 15. A resilient pad 32 is adhered onto the bottom surface 34 of the body 20 for stability and adhesion to a flat surface. The vacuum insulated container body 20 has a double wall 36 vacuum construction as illustrated in FIGS. 8, 11 and 14 and preferably has a stainless steel 18/8 food grade material construction. An ornamental expandable band 38 is adhered adjacent to the open top 22 and a coat of paint 40 may preferably cover the body 20 with the exception of an area above the ornamental expandable band 38.

A top closure 42 has male threads 44 that interface onto the open top 22 and mate with the container body female threads 24. The top closure 42 has a smooth lip 46 for drinking a beverage that is contained within and a center opening 48 in a closure bulkhead 50. A silicone mushroom shaped flexible diaphragm plug 52 is retained within the bulkhead center opening 48. A plurality of slots 54 are formed within the bulkhead 50 surrounding the center opening 48 such that the diaphragm plugs 52 flexibility permits liquid to pass through the slots 54 for drinking from the liquid container 10 and covers the slots 54 when a lid is attached to the top closure 42 for containment. A circumferential seal groove 56 is formed in the top closure 42 and a resilient seal ring 58 is disposed therein for sealing the top closure onto the vacuum insulated container body. The top closure 42 includes internal male lid threads 60 for attachment of a lid onto the top closure 42. A number of opposed tapered bayonet lug studs 62 extend from a lower peripheral surface of the top closure 42, as shown in FIGS. 9, 12 and 15.

At least one removable attachment 64 is employed to process a beverage media, or provide covering, and each is manually connectable onto the top closure 42, The second embodiment of the invention, shown in FIGS. 7-9, utilizes an infuser 66 for the at least one removable attachment 64 which consists of a tapered cylindrical open top cup 68 having an enclosed bottom 70, a plurality of sidewall openings 72 and a plurality of screens 74 covering the sidewall openings 72, as illustrated in FIGS. 8 and 9. The open top cup 68 includes a plurality of opposed bayonet snap-in slots 96 for mating with the plurality of opposed tapered bayonet lug stud 62 permitting attachment there between. The cup height is essentially the same as the mean diameter of the cup permitting sufficient volume displacement to receive a beverage media, which may include individual tea leafs. When brewing media is placed in the infuser 66 and attached to the top closure 42, with hot water placed in the vacuum insulated container 10, and the top closure 42 is attached to the container 10, the hot water in contact with the brewing media permits steeping which forms a brew, thereafter the media may be removed and the brewed beverage may be sipped from the closure smooth lip 46 after a lid is removed.

The third embodiment of the invention, illustrated in FIGS. 10-12, utilizes a strainer 76 for the at least one removable attachment 64 which consists of a strainer bottom 78 having a raised peripheral lip 80 and a plurality of pie shaped openings 82. The raised peripheral lip 80 includes a plurality of opposed bayonet snap-in slots 96 for mating with the plurality of opposed tapered bayonet lug stud 62 permitting attachment there between. A plurality of filtering strainers 84, stainless steel or perforations (not shown) cover the pie shaped openings 82 such that when hot water placed in the vacuum insulated container 10, brewing media is added, and the top closure 42 is attached to the container 10, the hot water in contact with the brewing media permits steeping which forms a brew, thereafter the media is filtered with the filtering strainers 84 allowing the brewed beverage to be sipped from the closure smooth lip 46 after the lid is removed.

The fourth embodiment of the invention, depicted in FIGS. 13-16, utilizes an isolator 86 which has a silicone resilient bottom 88 with an extended peripheral lip 90 that includes an inwardly facing bead 92. The container top closure 42 includes a circumferential seal groove 56 permitting the inwardly facing bead 92 to interface with the seal groove 56 covering all exposed surfaces of the top closure 42, including the tapered bayonet lug studs 62, preventing exposure to all thermoplastic material.

A lid 98 is attached to the top closure 42 forming a liquid tight seal for the container by compressing the diaphragm plug 52 against the closure bulkhead 50. The lid 98 has a domed smooth top surface 100 with a plurality of grip serrations 102 in the periphery of the domed smooth top surface 100 and a plurality of female threads 104 for attachment to the top closure 42.

The top closure 42 and the lid 98 have a thermoplastic construction, consisting of, but not limited to, acrylic, allyl diglycol carbonate, polycarbonate, polystyrene, polysulfone, polyester sulfone or polyester.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A liquid container with attachments which comprises:
   a vacuum insulated container having a body with an open top on an apex end and integral female threads,
   a top closure having male threads, interface onto the open top with the container body female threads, wherein the vacuum insulated container top closure further having;
   a center opening in a closure bulkhead;
   the vacuum insulated container top closure further having;
   a mushroom shaped flexible diaphragm plug retained within the bulkhead center opening;
   a plurality of slots within the closure bulkhead surround the center opening such that the diaphragm plugs flexibility permits liquid to pass through the slots for drinking from the liquid container when the lid is removed and when the lid is attached the slots are covered for liquid containment, wherein the flexible diaphragm plug is comprised of a silicone material,
   at least one removable attachment, for processing beverage media, or to provide covering, is manually connectable onto the top closure, and
   a lid attached to the top closure forming a liquid tight seal for the container.

2. The liquid container as recited in claim 1 wherein the vacuum insulated container body has a bowling pin shape with a broad neck, and a truncated top.

3. The liquid container as recited in claim 1 wherein the vacuum insulated container body further comprising a resilient pad on a bottom surface of the body for stability and adhesion to a flat surface.

4. The liquid container as recited in claim 1 wherein the vacuum insulated container body further comprises a double wall vacuum construction.

5. The liquid container as recited in claim 1 wherein said vacuum insulated container body further comprises stainless steel 18/8 food grade material construction.

6. The liquid container as recited in claim 1 wherein the vacuum insulated container body further comprises an ornamental expandable band adhered adjacent to the open top and a coat of paint beneath the ornamental expandable band.

7. The liquid container as recited in claim 1 wherein said vacuum insulated container top closure further comprises a smooth lip for drinking a beverage contained within.

8. The liquid container as recited in claim 1 wherein the vacuum insulated container top closure further having a circumferential seal groove therein with a resilient seal ring disposed therein for sealing between the top closure and the vacuum insulated container body.

9. The liquid container as recited in claim 1 wherein the vacuum insulated container top closure further having internal male lid threads for attachment of the lid to the top closure.

10. The liquid container as recited in claim 1 wherein the vacuum insulated container top closure further comprises a plurality of opposed tapered bayonet lug studs extending from a lower peripheral surface.

11. The liquid container as recited in claim 10 wherein the at least one removable attachment have a plurality of opposed bayonet snap-in slots for mating with the plurality of opposed tapered bayonet lug studs permitting attachment there between.

12. The liquid container as recited in claim 1 wherein the least one removable attachment further comprises an infuser having;
   a tapered cylindrical open top cup with an enclosed bottom;
   a plurality of sidewall openings in the cup;
   a plurality of screens covering the sidewall openings; and
   a height essentially the same as a mean diameter of the tapered cylindrical open top cup permitting sufficient volume displacement to receive a beverage media, including individual tea leafs, such that when brewing media is placed in the infuser and attached to the top closure; hot water placed in the vacuum insulated container, and the top closure is attached to the container, the hot water in contact with the brewing media permits steeping forming a brew, thereafter the media may be removed and the brewed beverage may be sipped from the closure when the lid is removed.

13. The liquid container as recited in claim 1 wherein the at least one removable attachment further comprises a strainer having;
   a strainer bottom with a raised peripheral lip;
   a plurality of pie shaped openings in the strainer bottom;
   a plurality of pie shaped strainers covering the plurality of pie shaped openings; and
   wherein; the strainer is attached to the top closure, hot water is placed in the vacuum insulated container, brewing media is added to the water, the top closure is attached to the container, the hot water in contact with the brewing media permits steeping forming a brew, thereafter the media is filtered with the strainer after the lid is removed the brewed beverage may be sipped from the closure.

14. The liquid container as recited in claim 1 wherein said lid further comprises,
   a domed smooth top surface;
   a plurality of grip serrations in the periphery of the domed smooth top surface, and a plurality of female threads for attachment to the top closure.

15. The liquid container as recited in claim 1 wherein the top closure and the lid further comprises a thermoplastic construction, wherein the thermoplastic is selected from the group consisting of acrylic, allyl diglycol carbonate, polycarbonate, polystyrene, polysulfone, polyester sulfone and polyester.

16. A liquid container with attachments which comprises:
a vacuum insulated container having a body with an open top on an apex end and integral female threads,
a top closure having male threads, interface onto the open top with the container body female threads,
at least one removable attachment, for processing beverage media, or to provide covering, is manually connectable onto the top closure, wherein the at least one removable attachment further comprises a isolator having;
a resilient bottom with a raised peripheral lip that includes an inwardly facing bead;
wherein the resilient bottom further having a silicone construction;
wherein the vacuum insulated container top closure having circumferential seal groove therein permitting the inwardly facing bead to interface with the seal groove in place of the seal ring therefore covering all exposed surfaces of the top closure preventing exposure of all thermoplastic material, and
a lid attached to the top closure forming a liquid tight seal for the container.

* * * * *